United States Patent [19]

Swanfeld

[11] Patent Number: 5,304,229
[45] Date of Patent: Apr. 19, 1994

[54] GLASSWARE FORMING MACHINE WITH COOLING SYSTEM

[75] Inventor: Edward R. Swanfeld, Vineland, N.J.

[73] Assignee: I.M.T.E.C. Enterprises, Inc., Tulsa, Okla.

[21] Appl. No.: 757,133

[22] Filed: Sep. 10, 1991

Related U.S. Application Data

[63] Continuation of Ser. No. 612,833, Nov. 13, 1990, abandoned.

[51] Int. Cl.⁵ .............................................. C03B 9/38
[52] U.S. Cl. ......................................... 65/265; 65/267; 65/319; 65/356
[58] Field of Search ................. 65/355, 356, 267, 265, 65/319, 317

[56] References Cited

U.S. PATENT DOCUMENTS 4,561,875 12/1985 Foster ..................................... 65/356
4,909,823 3/1990 Bolin ...................................... 65/356

FOREIGN PATENT DOCUMENTS 2151608 7/1985 United Kingdom ................. 65/365

OTHER PUBLICATIONS

Websters' Ninth New Collegiate Dictionary, Merriam-Webster Inc., 1990 p. 775.

Primary Examiner—Joye L. Woodard
Assistant Examiner—John Hoffmann
Attorney, Agent, or Firm—Senniger, Powers, Leavitt & Roedel

[57] ABSTRACT

A cooling system for a glassware forming machine in which air is delivered to each of two plenums for upward flow of air through vertical passages in mold members on the plenums from an air outlet in the base of the machine via a tubular air dust having its lower end axially slidable in a part-spherical knuckle mounted for universal movement in an annular bearing in the air outlet having an internal part-spherical surface, and its upper end externally formed with a part-spherical formation mounted for universal movement in a part-spherical annular bearing at the bottom of the plenum.

6 Claims, 4 Drawing Sheets

GLASSWARE FORMING MACHINE WITH COOLING SYSTEM

This is a continuation of application Ser. No. 612,833, filed Nov. 13, 1990, now abandoned.

BRIEF SUMMARY OF THE INVENTION

This invention relates to glassware forming machines and more particularly to a cooling system for the mold members of such a machine for forming glass bottles.

The invention is especially directed to cooling systems for the mold members of glassware forming machines of the type such as shown in U.S. Pat. Nos. 3,849,101, 4,231,253, 4,361,434, 4,388,099, 4,561,875, 4,750,929 and 4,842,637 wherein air is blown through passages in the mold members for cooling them.

Among the several objects of the invention may be noted the provision of an improved simplified compact system for delivering air to the mold members for flow of air through the air passages therein allowing for their swinging toward and away from one another between their open and closed positions, providing for relatively low restriction to flow of air and relatively uniform and efficient cooling of the mold members for production of glassware (especially bottles) at relatively high speed with relatively few defects, relatively low energy consumption in blowing air, and relatively low noise levels; and the provision of such a system wherein wear of parts is reduced for longer life of the system.

In certain respects the invention involves an improvement over the cooling systems disclosed in U.S. Pat. Nos. 4,561,875 and 4,842,637, the latter especially being incorporated herein by reference.

In general, a glassware forming machine of this invention comprises a pair of carriers each pivoted on a generally vertical axis for swinging movement toward and away from each other between an open position and a closed position, a plurality of mold members carried by each carrier, each mold member on each carrier being related to a mold member on the other so that, with the carriers in their said closed position, each mold member on one carrier mates with a mold member on the other to define a mold cavity for molding an item of glass. Each mold member has air passages extending therethrough for passage of air for cooling. Each carrier carries a plenum for delivering air to the air passages of the mold members carried by the carrier, the plenum having ports for flow of air into the passages in the mold members and thence through and out of said passages. Chamber means is provided below said carriers for air to be blown into the plenums and thence up through said air passages. Means for delivery of air from said chamber means to each plenum allowing swinging of said carriers comprises, for each carrier a first annular bearing member mounted in an opening at the top of the chamber, and a second annular bearing member mounted in an opening at the bottom of the plenum. Each bearing member is mounted in its respective opening with its axis generally vertical so that each is open from bottom to top and each having a part-spherical internal surface. One of the bearing members has a part-spherical knuckle mounted for universal movement therein with a substantially air-tight seal between the part-spherical external surface of the knuckle and the part-spherical internal surface of the bearing member, the knuckle having a diametrical opening therein extending from bottom to top thereof. A tubular member constituting a conduit for flow of air from the chamber to the plenum has one end thereof slidable in the diametrical opening in the knuckle with a substantially air-tight sliding sealing fit therein and at the other end thereof has an external part-spherical formation mounted for universal movement in the other bearing member with a substantially air-tight seal between said external part-spherical end formation on the conduit and the part-spherical internal surface of said other bearing member. The conduit extends up from the chamber to the plenum and is open at its lower end for entry of air thereinto from the chamber and open at its upper end for exit of air therefrom into the plenum. The universal mounting of the knuckle in the one bearing member in conjunction with the sliding of the conduit at its said one end in the knuckle and the universal mounting of the conduit at its said other end permit the swinging of the carrier for the plenum.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION

Figure 1:
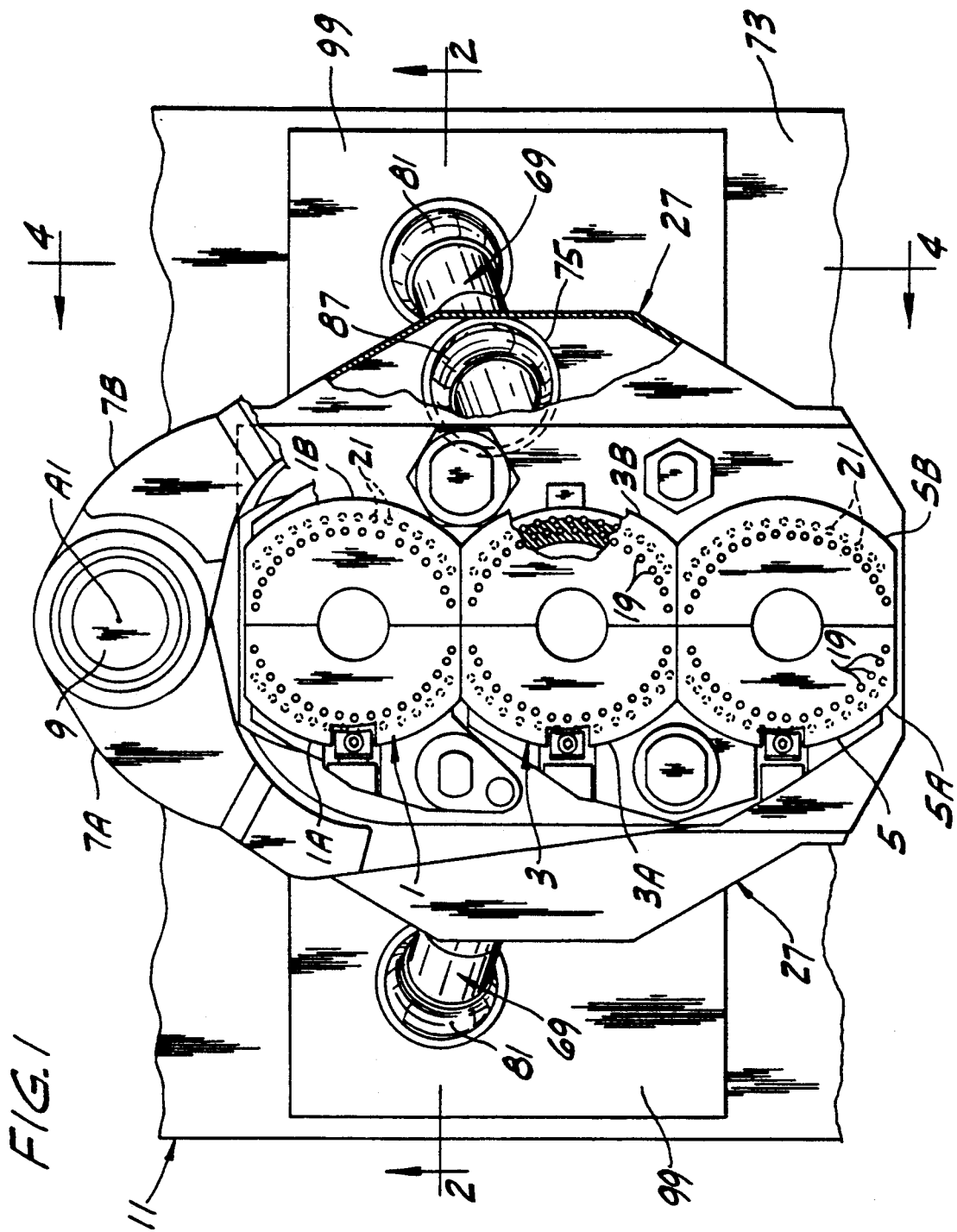
FIG. 1 is a plan, with parts broken away and shown in section, of the mold side of an individual section of a glassware forming machine in which the present invention is embodied, the mold carriers and mold members on the mold side of said section of the machine being shown in closed position.

Referring to the drawings, the invention is illustrated as it is embodied on what is called the "mold side" of an individual section of a cyclically operating glassware forming machine of the individual section type, such as referred to in the above-noted U.S. Pat. Nos. 4,561,875 and 4,842,637 for cooling the mold members in which a parison or blank, formed on the parison or blank molding side of the section, is blown to form the final product, e.g. a bottle. The invention may also be embodied in the blank molding side of a section for cooling the blank mold members on that side. As illustrated in FIG. 1, the stated section of the glassware forming machine is of the type referred to as a triple gob section, comprising three pairs 1, 3 and 5 of mold members for molding three bottles at a time, each member constituting a mold half, as shown in said U.S. Pat. No. 4,842,637, which may be incorporated herein by reference. It will be understood that the invention is applicable to glassware forming machine sections other than a triple gob section, e.g. a two-gob section. The two members of the first pair are designated 1A and 1B, the two members of the second pair are designated 3A and 3B and the two members of the third pair are designated 5A and 5B. The three mold members 1A, 3A and 5A are carried by a carrier 7A and the three mold members 1B, 3B, 5B are carried by a carrier 7B, the carriers being pivoted on a first and fixed generally vertical axis indicated at A1 for swinging movement toward and away from each other between the closed position in which they are illustrated in FIG. 1, wherein mold members 1A and 1B, 3A and 3B, 5A and 5B and closed on each other for the blow molding of a blank into a bottle in each of the closed pairs of members, and an open position, wherein the two mold members of each pair of mold members are spaced from each other for entry therebetween of blanks and for removal of completed bottles. The carriers 7A and 7B are pivoted on a vertical shaft 9 which extends up from the top of a base 11 of the stated individual section of the glassware forming machine, suitable mechanism well-known in the art being provided for cyclically swinging the carriers between their open and closed positions for the bottle molding process.

Each mold member 1A, 1B, 3A, 3B, 5A and 5B constitutes a mold half, having a cavity 13 therein which is shaped in accordance with the shape of a bottle to be formed so that, with the two mold halves brought together in closed position, the cavities of the two halves define the shape of the wall and part of the neck of the bottle. At the bottom, the two mold halves of each pair closes on a mold bottom member 15 as well known in the art. The bottom of the bottle is formed against the mold bottom member 15, and the bottle is supported on the latter when the mold halves open. Each mold half has a generally arcuate peripheral wall 17 having air passages such as indicated at 19 and 21 extending upwardly from the bottom thereof, each of these passages opening into the ambient atmosphere at its upper end or passage of air through the passages for cooling the mold half, the air exiting into the ambient atmosphere from the upper ends of the passages. Passages 19 constitute an inner group of passages extending from bottom to top of the mold half on part of an inner circle. Passages 21 constitute an outer group of passages in an enlarged-diameter lower part 23 of the mold half on part of an outer circle, these passages opening into the ambient atmosphere at the top of said lower part 23 (see FIG. 2).

Means designated 25 in its entirety is provided for blowing air through the air passages 19 and 21 in both the open and closed positions of the mold halves, comprising a plenum 27 carried by each of the carriers 7A and 7B. The mold halves 1A etc. carried on each carrier extend up from the plenum on that carrier, the plenum having ports 29 (see FIG. 2) at the top thereof for flow of air up into the passages 19 and 21 in the mold halves on the plenum and thence up through and out of the passages. Each plenum has a relatively shallow inner section 31 and a relatively deep outer section 33, these sections having a common flat top wall 35, this wall and other walls of the plenum defining a plenum chamber 47. At the inside, the plenum is of scalloped formation having three scallops such as indicated at 49 in U.S. Pat. No. 4,842,637, one for each of the three respective mold halves carried on the plenum. Each mold half has a reduced-diameter lower end portion 51 which fits in a respective scallop as in U.S. Pat. No. 4,842,637. At the upper end of the reduced diameter lower end portion, each mold half has an outwardly extending downwardly facing flat horizontal shoulder portion 53 which seats on the top wall of the respective plenum around the respective scallop. The passages 19 and 21 extend upward from this shoulder, and each of the ports 29 is constituted by an arcuate slot in the top wall 35 of the plenum adjacent the respective scallop as in U.S. Pat. No. 4,842,637. Each mold half is removably associated in suitable manner with the respective plenum with the lower ends of the passages 19 and 21 of the mold half in register with a respective arcuate slot.

The carriers 7A and 7B may be made as shown in U.S. Pat. No. 4,853,023 which is incorporated herein by reference, with upper and lower extensions 55 and 57 corresponding to those indicated at 11 and 13 in U.S. Pat. No. 4,853,023 and upper and lower mold holding assemblies such as indicated at 21 and 23 in U.S. Pat. No. 4,853,023 and here designated 59 and 61. Each of the plenums 27 is mounted as indicated at 63 on the bottom of the respective lower mold holding assembly 61, with a shim 65 therebetween.

As previously described, the shaft 9 on which the carriers or arms 7A, 7B are pivoted extends up from the base 11 of the stated section of the glassware forming machine, this base being formed to provide and thereby constituting means providing a chamber 67 for air to be blown into the plenums and thence up through the passages 19 and 21 in the mold halves 1A etc. both when they are in their closed position and when they are in their open position. The base with the chamber 67 therein is sometimes referred to as the "wind box" of the machine. The chamber is supplied with air by a blower (not shown) in a manner well known in the art.

Means of this invention indicated generally at 69 is provided for delivery of air from the chamber to each plenum 27, this means being such as to allow swinging of the carriers 7A, 7B. The air delivery means 69 for the left-hand plenum and the air delivery means 69 for the right-hand plenum are identical except for being of opposite hand, and a description of one will suffice for both. Each comprises an opening or outlet 71 in a top plate 73 of the chamber or wind box 67, and an opening 75 at the bottom of the outer section 33 of the respective plenum 27. A first annular bearing member 77 is mounted in opening 71 and a second annular bearing member 79 is mounted in a retainer 80 on the bottom of the deep plenum section 33 at opening 75. Each bearing member 77 and 79 is mounted in its respective opening 71, 75 with its axis generally vertical so that each is open from bottom to top. Member 77 has a part-spherical internal surface 77a; member 79 has a part-spherical internal surface 79a. Member 77 has a part-spherical knuckle 81 mounted for universal movement therein with a substantially air-tight seal between the part-spherical external surface 81a of the knuckle and the part-spherical internal surface 77a of member 77. The knuckle 81 has a diametrical opening or bore 83 extending from the bottom to the top thereof. A tubular member 85 constituting a conduit for flow of air from the chamber 67 to the plenum 27 has one end thereof (its lower end) slidable in the diametrical opening or bore 83 in the knuckle 81 with a substantially air-tight sliding sealing fit therein and, at the other end thereof (its upper end), has an external part-spherical formation 87 mounted for universal movement in the bearing member 79 with a substantially air-tight seal between the surface of said external part-spherical end formation 87 and the part-spherical internal surface 79a of the earing member 79. The conduit 85, which may be made in one piece, extends up from the chamber 67, being open at its lower end as indicated at 89 for entry of air thereinto from the chamber 67 and open at its upper end as indicated at 91 for exit of air therefrom into the plenum 27.

The annular bearing member 77 seats at its lower end on a shoulder 93 in a cylindric recess 95 in a block 97 received in the opening 71 fastened suitably (as by screws) to the bottom of a plate 99 which in turn is fastened on top of plate 73 by cap screws as indicated at 101. At 103 is indicated an air cylinder which is secured to the bottom of the block 97 as indicated at 105, this air cylinder extending vertically in the chamber 67. The piston rod 107 of this cylinder extends up and out of the upper end of the cylinder and carries a valve member 109 for controlling flow of air from chamber 67 into the lower end of the conduit 85. The retainer 80 for each upper bearing member 79 may be provided with a lubricant fitting 111 for librication purposes.

Figure 2:
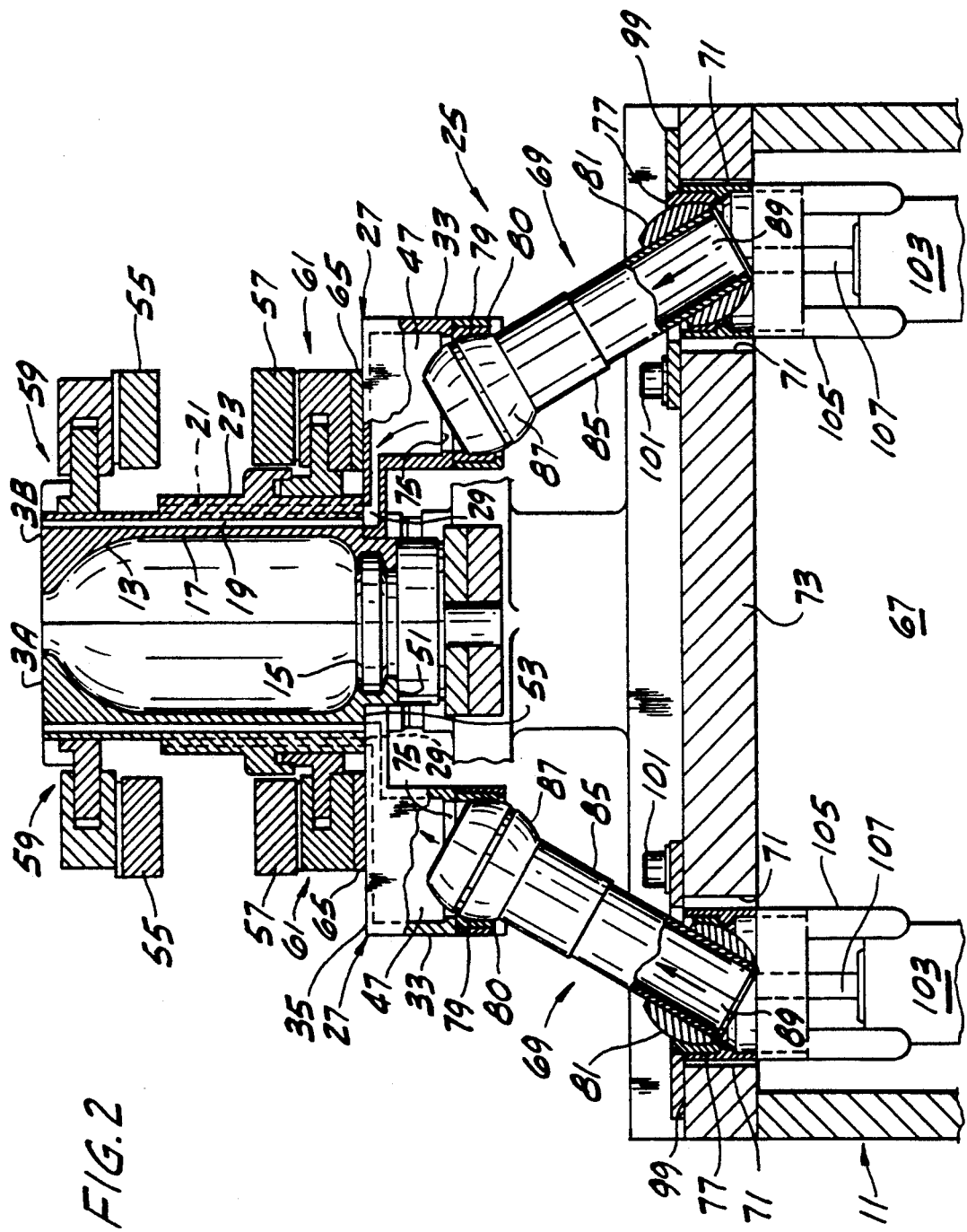
FIG. 2 is a vertical section generally on line 2—2 of FIG. 1.
Figure 3:
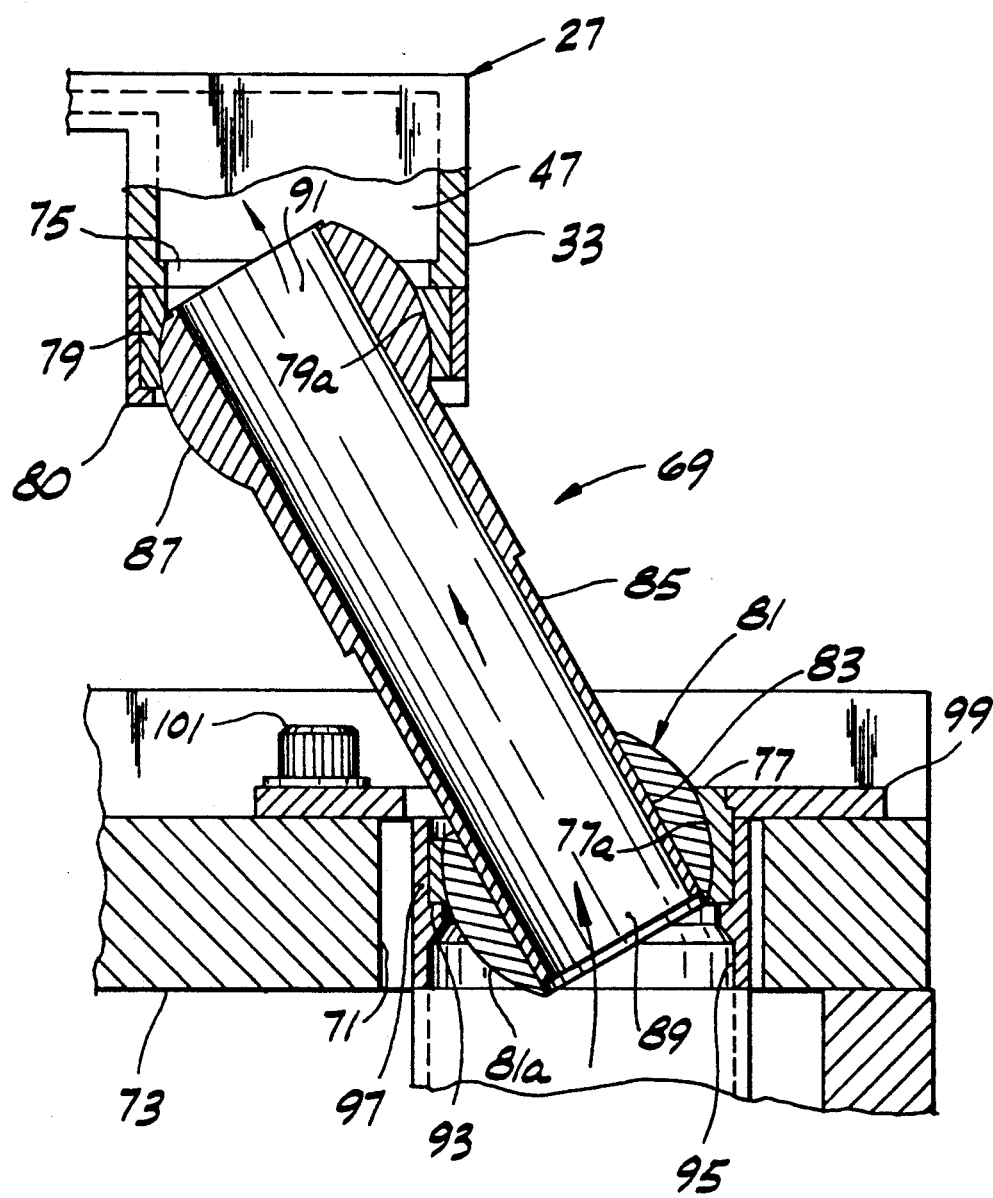
FIG. 3 is an enlarged fragment of FIG. 2.
Figure 4:
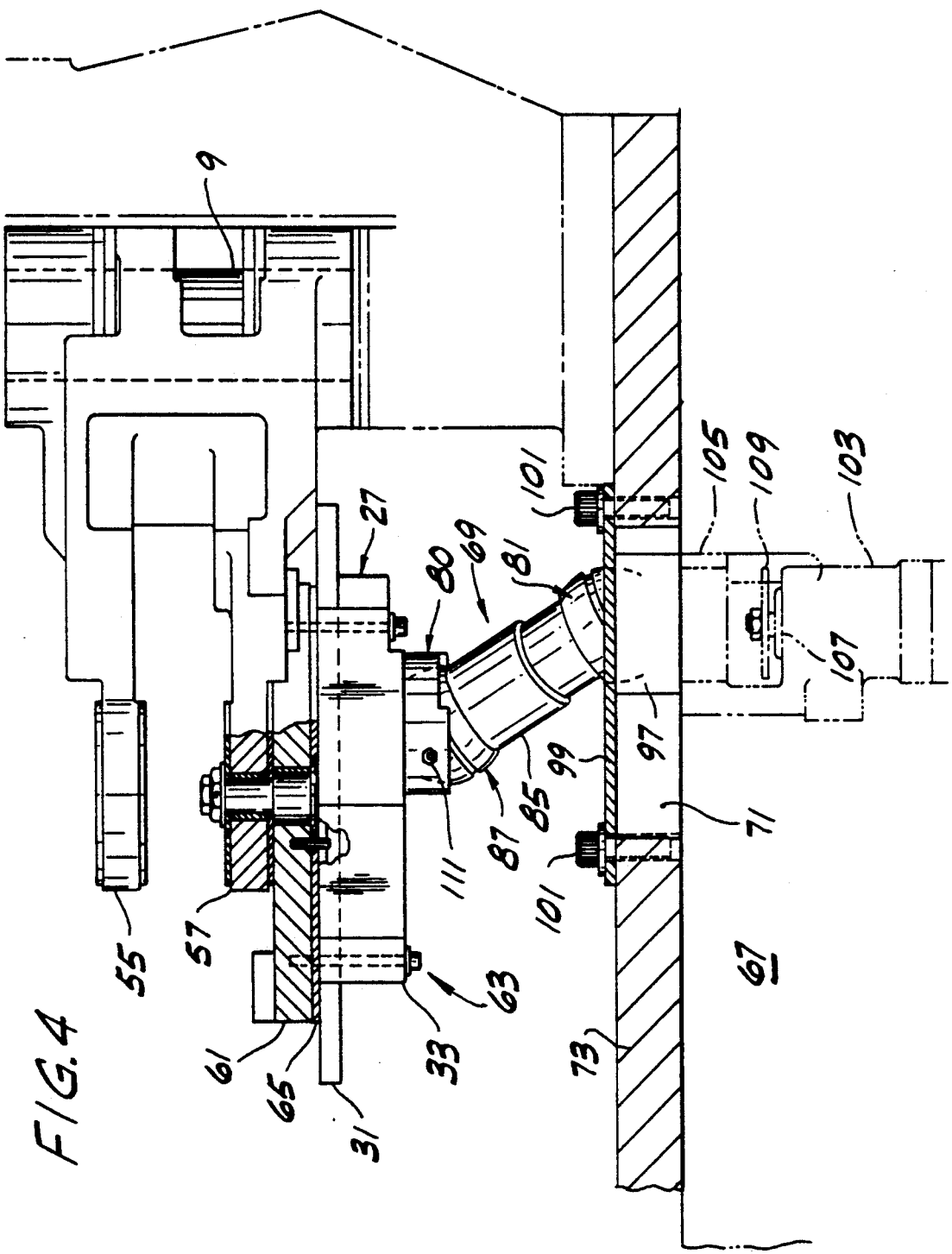
FIG. 4 is a vertical section generally on line 4—4 of FIG. 1.

With each conduit 85 mounted at its lower end for sliding movement in the knuckle 81, with the knuckle 81 mounted for universal movement in its bearing 77, and with each conduit 85 mounted by means of its part-spherical upper end formation 87 in the bearing 79, the plenums 27 (carried by arms 7A and 7B) are allowed to swing toward and away from one another between their open and closed positions (the closed position being shown in FIGS. 1 and 2). This is because the universal mounting at the upper and lower ends of the each conduit permit it to change its angle and the sliding mounting at the lower end of each conduit permits it to change what amounts to its effective length between chamber 67 and the respective plenum. And the arrangement is such that air for cooling each mold may flow with relatively low restriction from chamber 67 through the respective conduit 85 to the respective plenum 27.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A glassware forming machine comprising:

a pair of carriers each pivoted on a generally vertical axis for swinging movement toward and away from each other between an open position and a closed position;

a plurality of mold members carried by each carrier, each mold member on each carrier being related to a mold member on the other so that, with the carriers in their said closed position, each mold member on one carrier mates with a mold member on the other to define a mold cavity for molding an item of glass;

each mold member having air passages extending therethrough for passage of air for cooling;

a plenum carried by each carrier for delivering air to the air passages of the mold members carried by the carrier, the plenum having ports at the top for flow of air up into the passages in the mold members and thence through and out of said passages and having an opening at the bottom;

means providing a chamber below said carriers for air to be blown into the plenums and thence up through said air passages, and means for delivery of air from said chamber means to each plenum allowing swinging of said carriers and comprising, for each carrier:

a first annular bearing member mounted in an opening at the top of the chamber;

a second annular bearing member mounted in said opening at the bottom of the plenum;

each bearing member being mounted in its respective opening with its axis generally vertical so that each is open from bottom to top;

each bearing member having a part-spherical internal surface;

one of said annular bearing members having a part-spherical knuckle mounted for universal movement therein with a substantially air-tight seal between the part-spherical external surface of the knuckle and the part-spherical internal surface of the bearing member;

said knuckle having a diametrical opening therein extending from bottom to top thereof;

a tubular member constituting a conduit for flow of air from the chamber to the plenum having one end thereof slidable in the diametrical opening in the knuckle with a substantially air-tight sliding sealing fit therein and having at the other end thereof an external part-spherical formation mounted for universal movement in the other bearing member with a substantially air-tight seal between said external part-spherical end formation on the conduit and the part-spherical internal surface of said other bearing member;

said conduit extending up from the chamber to the plenum and being open at its lower end for entry of air thereinto from the chamber and open at its upper end for exit of air therefrom into the plenum;

the universal mounting of the knuckle in the one bearing member in conjunction with the sliding of the conduit at its said one end in the knuckle and the universal mounting of the conduit at its said other end permitting the swinging of the carrier for the plenum.

2. A glassware forming machine as set forth in claim 1 wherein the knuckle is mounted for universal movement in the first annular bearing member at the top of the chamber.

3. A glassware forming machine as set forth in claim 2 having a base forming the chamber, said base having a top plate, the opening for the first annular bearing member being in said top plate.

4. A glassware forming machine as set forth in claim 1 wherein said external part-spherical formation on said other end of said conduit projects out of said other bearing member.

5. A glassware forming machine as set forth in claim 2 wherein said other bearing member is mounted in said opening at the bottom of the plenum, said external part-spherical formation on said other end of said conduit being at the upper end of said conduit and projecting down out of said other bearing member.

6. A glassware forming machine as set forth in claim 2 having means in said opening at the top of the chamber holding said first annular bearing member in place in said opening at the top of the chamber, and wherein the conduit is out of contact with said holding means when the carriers are in their said closed position.

* * * * *